No. 743,277. Patented November 3, 1903.

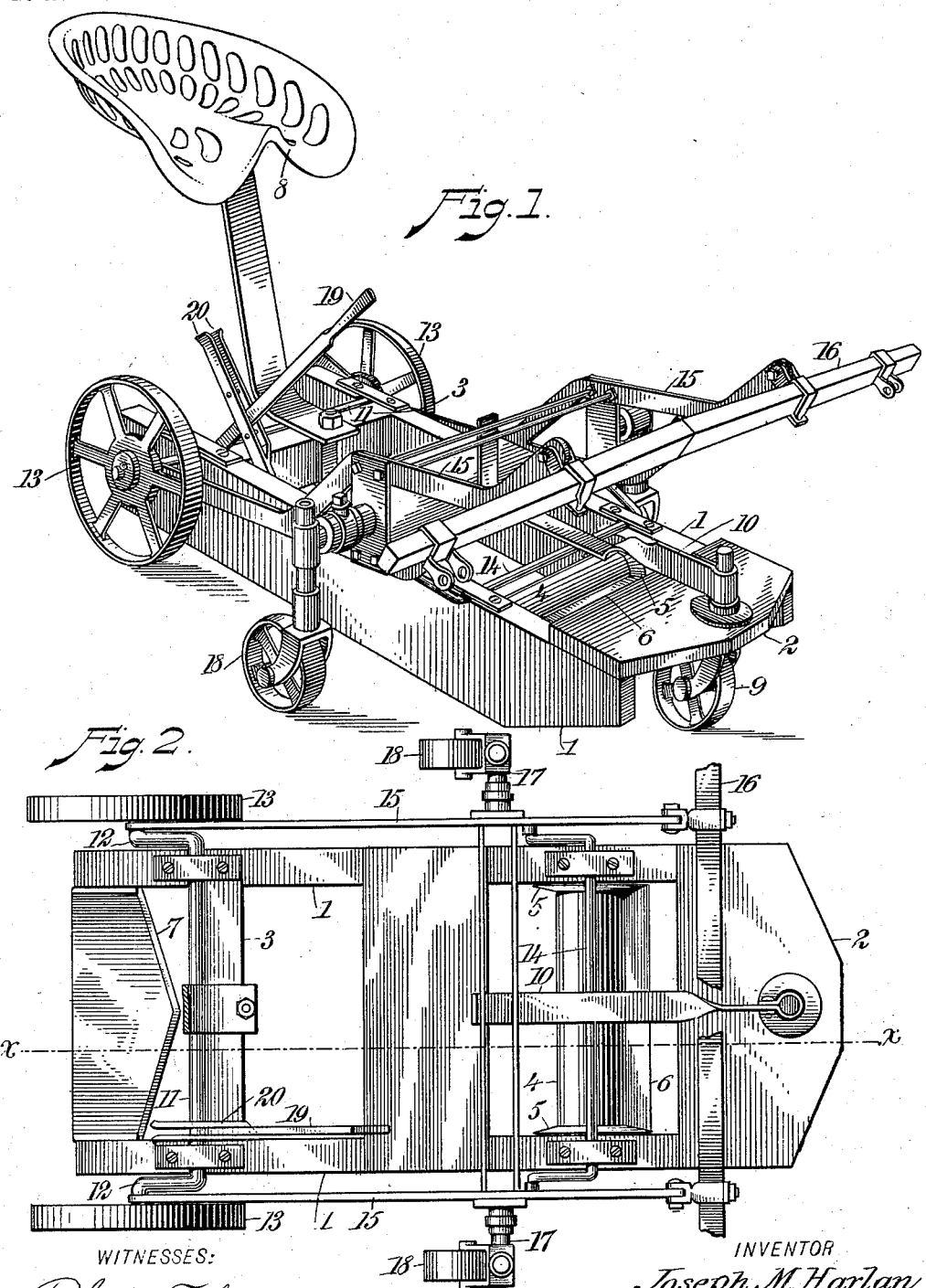

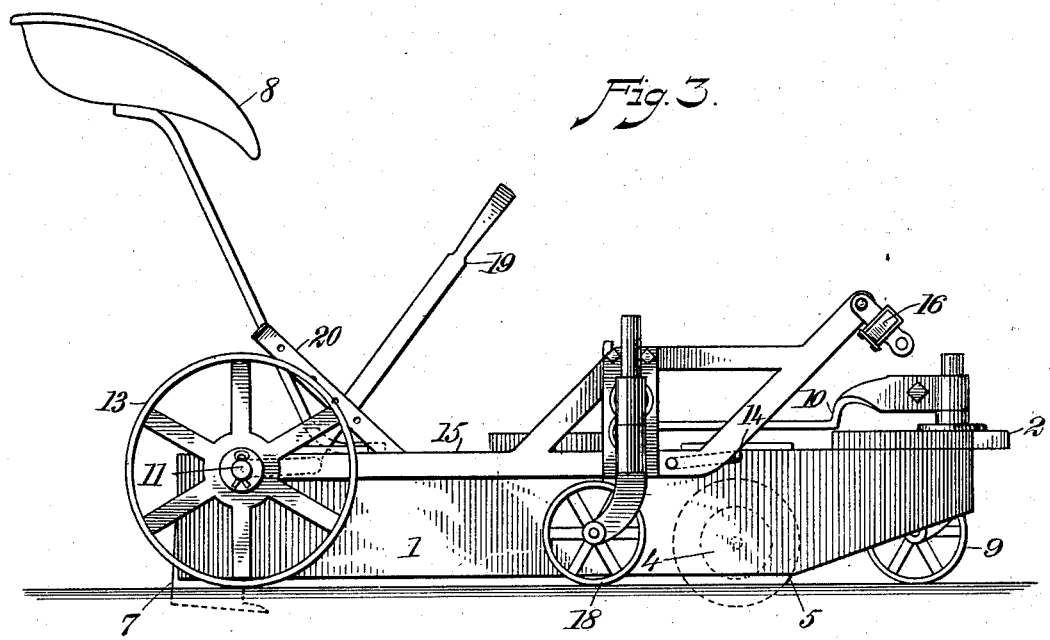
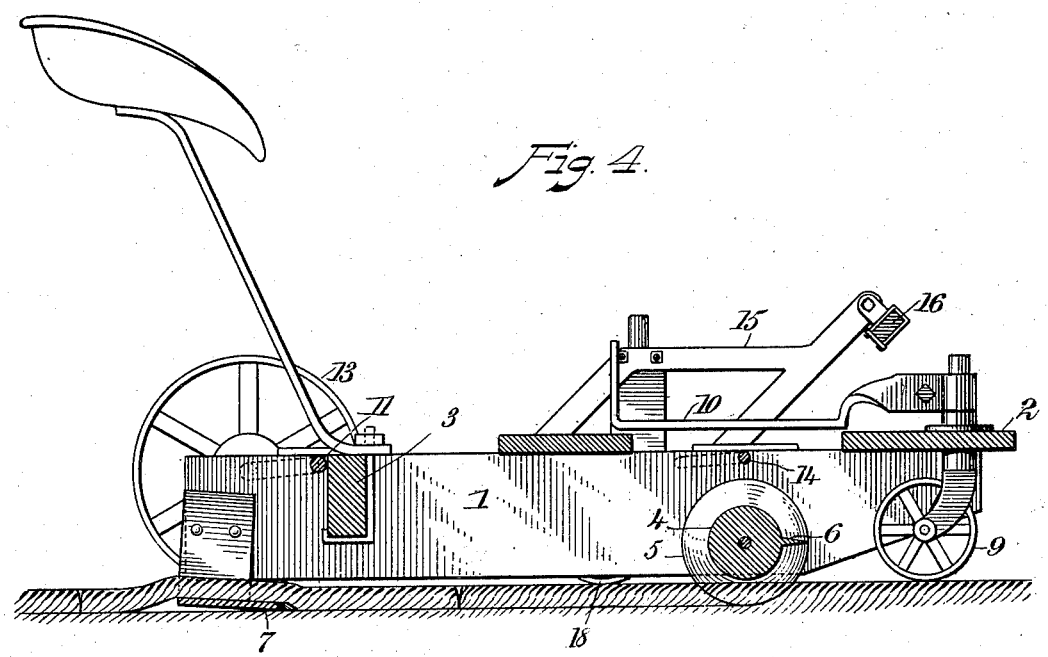

UNITED STATES PATENT OFFICE.

JOSEPH MARSHALL HARLAN, OF ARDMORE, PENNSYLVANIA.

SOD-CUTTER.

SPECIFICATION forming part of Letters Patent No. 743,277, dated November 3, 1903.

Application filed February 12, 1903. Serial No. 143,022. (No model.)

*To all whom it may concern:*

Be it known that I, JOSEPH MARSHALL HARLAN, a citizen of the United States, and a resident of Ardmore, in the county of Montgomery and State of Pennsylvania, have invented a new and Improved Sod-Cutter, of which the following is a full, clear, and exact description.

This invention relates to improvements in machines for cutting grass-sod, the object being to provide a sod-cutter of simple construction, designed to be drawn by a draft animal or animals, and by means of which the sod may be rapidly and evenly cut.

I will describe a sod-cutter embodying my invention and then point out the novel features in the appended claims.

Reference is to be had to the accompanying drawings, forming a part of this specification, in which similar characters of reference indicate corresponding parts in all the figures.

Figure 1 is a perspective view of a sod-cutter embodying my invention. Fig. 2 is a plan view thereof. Fig. 3 is a side elevation, and Fig. 4 is a section on the line x x of Fig. 2.

The main frame of the machine comprises side rails 1, connected at the front by a plate 2, and connected near the rear by a cross-bar 3. Arranged in the forward portion of the main frame is a roller 4, on the ends of which are annular cutting-blades 5, designed to form the longitudinal cuts through the sod. Also connected to the roller and extended lengthwise thereof between the annular cutters is a blade 6 for forming the transverse cuts. At the rear portion of the frame is a plate-like blade 7 for undercutting the sod. On the rear portion of the frame is a driver's seat 8, and at the front end is a steering-wheel 9. The shank of this steering-wheel 9 passes up through the plate 2, and a tiller-bar 10 extends rearward therefrom sufficiently far to permit the driver to operate the tiller-bar for steering the machine by his feet.

Having bearings on the main frame near the rear portion is an axle 11, having crank portions 12, on the spindles of which are the bearing-wheels 13. Having bearings on the main frame forward of the axle is a crank-shaft 14. Extended along the sides of the main frame are side bars 15, the rear ends of which connect with the spindles of the axle 11, and the crank portions of the crank-shaft 14 also engage pivotally with said bars. The front ends of the side bars 15 are inclined upward and are designed to be connected by a draft-bar 16, to which one or more animals may be attached. Attached to the side bars 15 are brackets 17, in which the pintles of rollers 18 are arranged to rotate and to move vertically. A lever 19 is connected to the axle 11 and moves between guides 20, these guides being provided with holes for receiving a pin or pins to hold the lever 19 in adjusted position. By operating said lever 19 the cranks of the axle 11 and the cranks of the crank-shaft 14 will be moved so as to lift the main frame, whereby the depth of cut of the cutting devices may be regulated, or the cutting devices may be raised wholly above the ground when it is desired to move the machine from one field to another or along a road.

The operation of the machine is as follows: When moved along, the annular cutters 15 will form the longitudinal cuts, and then the blade 6 will go into operation to form the transverse cuts, after which the under cuts will be made by the blade 7, and thus the sod will be completely separated or released from the ground, and obviously the series of sods will be all of the same dimensions.

Having thus described my invention, I claim as new and desire to secure by Letters Patent—

1. A sod-cutter comprising a frame, wheels supporting the frame, annular cutters arranged in the frame, a cutter extended lengthwise between the annular cutters, an under cutter carried by the frame rearward of the first-named cutters and means for simultaneously raising all of the cutters above the ground-surface.

2. A sod-cutter comprising a vertically-adjustable frame, wheels on which the frame is mounted, annular cutters arranged in the frame, a cutter extended lengthwise between the annular cutters, an under cutter carried by the frame rearward of the first-named cutters and means for elevating the frame to simultaneously adjust the several cutters vertically.

3. A sod-cutter comprising a main frame, a crank-shaft having bearings on the main frame, a crank-axle, wheels on said axle, side bars connecting with the cranks of the shaft and with the spindles of the axle, a lever extended from the axle, wheels carried by said side bars, and cutters carried in the main frame.

4. A sod-cutter comprising a main frame, a crank-shaft having bearings on the main frame, a crank-axle, wheels on said axle, side bars connecting with the cranks of the shaft and with the spindles of the axle, a lever extended from the axle, wheels carried by said side bars, cutters carried in the main frame, a steering-wheel at the front end of the main frame, and a tiller extended rearward from said steering-wheel.

5. A sod-cutter comprising a frame, a crank-shaft having bearings in the main frame, a crank-axle, wheels on said axle, side bars connecting with the cranks of the shaft and with the spindles of the axle, a lever extended from the axle, wheels carried by said bars and having vertical movement with relation thereto, the forward ends of said side bars being inclined upward, a draft-bar connected to said forward ends, and cutters carried in the frame.

In testimony whereof I have signed my name to this specification in the presence of two subscribing witnesses.

JOSEPH MARSHALL HARLAN.

Witnesses:
  WALTER E. PARKER,
  A. E. HOUSER.